United States Patent [19]

George

[11] 4,282,284

[45] Aug. 4, 1981

[54] FLAME AND HEAT RESISTANT ELECTRICAL INSULATING TAPE

[75] Inventor: Stephen George, Bronx, N.Y.

[73] Assignee: Textured Products, Inc., Mt. Vernon, N.Y.

[21] Appl. No.: 73,362

[22] Filed: Sep. 7, 1979

Related U.S. Application Data

[63] Continuation-in-part of Ser. No. 931,121, Aug. 4, 1978, abandoned.

[51] Int. Cl.³ .................. B32B 7/00; B32B 17/06; D02G 3/00
[52] U.S. Cl. ........................... 428/251; 174/121 SR; 428/253; 428/285; 428/286; 428/343; 428/355; 428/377; 428/383; 428/389; 428/432
[58] Field of Search .............. 428/377, 379, 384, 389, 428/273, 240, 241, 242, 251, 253, 254, 263, 269, 268, 245, 290, 289, 283, 285, 325, 328, 329, 432, 255; 174/124 GC, 122 G, 122 C, 121 A, 121 SR, 110 A, 118

[56] References Cited

U.S. PATENT DOCUMENTS

| | | | |
|---|---|---|---|
| 2,022,827 | 12/1935 | Ruben | 174/121 A |
| 2,587,916 | 3/1952 | Squier | 174/124 G |
| 2,992,124 | 7/1961 | Campbell | 428/268 |
| 3,006,794 | 10/1961 | Sheldon | 174/122 G |
| 3,013,902 | 12/1961 | Bugosh | 174/124 GC X |
| 3,095,336 | 6/1963 | Church | 428/273 |
| 3,259,536 | 7/1966 | Gaeth et al. | 428/289 X |
| 3,602,636 | 8/1971 | Evans | 174/124 GC |
| 3,632,412 | 1/1972 | Blance | 428/263 X |
| 3,695,925 | 10/1972 | Weil | 428/254 |
| 3,861,425 | 1/1975 | Clark | 428/432 X |
| 4,018,962 | 4/1977 | Pedlow | 174/121 A |

FOREIGN PATENT DOCUMENTS

| | | | |
|---|---|---|---|
| 470244 | 8/1937 | United Kingdom | 174/124 GC |
| 1058117 | 2/1967 | United Kingdom | 428/377 |

Primary Examiner—Lorraine T. Kendell
Attorney, Agent, or Firm—Scully, Scott, Murphy & Presser

[57] ABSTRACT

A flame resistant insulated electrical wire and/or cable construction formed by wrapping a wire or cable conductor with a heat resistant flexible refractory tape comprising a porous base fabric, preferably a knit fiberglass fabric that has been coated and impregnated with refractory materials. These refractory materials are bonded to both the surface and interstices of the base fabric by means of a bonding agent, such that the fabric remains flexible and retains its stretch properties. In the presence of relatively extreme temperature and heat (e.g., above 1750° F.), the bonding agent will decompose without flaming, while the refractory materials will fuse into the softened surface of the knit fiberglass base fabric forming a high temperature resistant structure with ceramic qualities and insulative properties.

7 Claims, 4 Drawing Figures

FLAME AND HEAT RESISTANT ELECTRICAL INSULATING TAPE

This is a continuation-in-part of U.S. patent application Ser. No. 931,121, filed Aug. 4, 1978, now abandoned.

BACKGROUND OF THE INVENTION

This invention relates to the art of fire resistant insulated electrical wire and/or cable constructions and more particulay to an improved insulated wire and/or cable construction that will function normally while subjected to heat and temperatures up to 1750° F. for a period of one hour.

There is a need for insulated electrical wire and/or cable constructions capable of withstanding the sustained high temperatures of fires to 1750° F. that may originate either externally of the wire or cable or internally as a result of electrical short circuit conditions.

Ceramics and/or glass fibers have been used heretofore to prepare electrical cables. In addition, coated fabrics and ceramic structures have been prepared with a combination of glass fiber fabrics and metal oxides.

U.S. Pat. No. 2,587,916 of Squier discloses a heat-detecting cable of a pair of electrical wires separated by a glass composition containing barium oxide and/or boron oxide which is non-conductive at normal temperature but is conductive at high temperatures. In one embodiment, the glass is in the form of a fabric having finely divided refractory materials distributed therein to enhance the ability to withstand high temperature. The barium oxide and/or boron oxide containing fiberglass tape does not insulate the wires at high temperature but rather provides a conductive path so as to detect high temperatures.

U.S. Pat. No. 3,602,636 of Evans discloses an electrical cable where the conductors are helically wrapped with an open weave glass cloth having a coating of a flame resistant synthetic rubber together with an extruded sheath of polyvinylchloride (PVC) or the like covering the assembled cable.

U.S. Pat. No. 3,632,412 of Blance et al. discloses a pressure sensitive adhesive for a Class F (high temperature service) electrical tape. The adhesive is an interpolymer of acrylates, methacrylates and hydroxyacrylates or hydroxymethacrylates. Glass cloth is included among the useful backing members for this tape.

U.S. Pat. No. 3,013,902 of Bugosh discloses fabrics coated with colloidal alumina and a final coating of a polymer having a plurality of free carboxylic acid groups. Glass fibers are included in the list of materials which may comprise the fabric substrate. These textile products have improved resistance to soiling and improved washability. No use for the fabrics in electrical tape, wire or cable is disclosed or suggested.

U.S. Pat. No. 3,095,336 of Church et al. discloses the preparation of ceramic articles laminated with glass fabric by impregnating glass fibers with a mixture of a thermosetting resin and a ceramic filler, curing the resin, heating to gasify the resin and then heating to an elevated temperature to fuse the glass fabric and the ceramic filler to produce rigid, laminated ceramic structures having high strength characteristics. No use in electrical tape, wire or cable is disclosed or suggested.

Plastic compounds (principally vinyl) and various elastomeric compounds are widely used as insulation and protective jacketing for electrical wire and cable products. When exposed to fire at an ignition flame temperature of 700° F. or above, vinyl and virtually all other elastomers provide fuel to propagate the fire and burn emitting toxic smoke.

The danger associated with electrical fires involving wire and cable insulation and jacketing have been recognized by the industry and a variety of efforts have been made to improve the performance of these products. Thus, fire retardant electrical insulation has been formed of asbestos fiber which has been widely used as part of the insulation and cover wrap material in the construction of fire resistant electrical wire and cable. However, asbestos fibers have now been identified as a carcinogen, and attempts are being made to phase out the use of asbestos.

In an effort to meet improved smoke and fire resistant standards for electrical wire or cable in high performance applications such as marine (ship and submarine), mining installations, oil drilling derricks, nuclear power plants, etc., explosion-proof, fire resistant conduit installations are normally specified. This involves the installation of steel pipe into which the electrical wires or cables are placed. A fire resistant compound is forced through the pipe under pressure to insulate the vinyl coated wires or cables from the effects of fire. This type of installation does limit the self propagating effects and smoke development of electrical fires. It is, however, costly and though minimizing flame transfer externally of the steel conduit acts to confine heat within the conduit, burning the wire or cable, creating an electrical short circuit condition and subsequent loss of power.

SUMMARY OF THE INVENTION

It is with the above considerations in mind that the present improved insulated electrical wire and/or cable construction has been evolved to provide an insulated electrical wire and/or cable that is heat resistant and will function according to designated electrical load specifications when exposed to fire or other high heat sources.

It is accordingly among the primary objects of this invention to provide an insulated electrical wire and/or cable construction that is flame and heat resistant and will resist the transmission of high temperatures associated with fire to and through the wire.

A further object of the invention is to provide a flame resistant insulated electrical wire and/or cable construction that will not support combustion or contribute fuel to propagate a fire.

A further object of the invention is to provide a flame resistant insulated electrical wire and/or cable construction that when subjected to the heat and flames of a fire will not emit any toxic smoke or toxic products of combustion.

A further object of the invention is to provide a flame resistant insulated electrical wire and/or cable construction that will not melt, drip or shrink when subjected to the heat and flames of a fire.

A further object of the invention is to provide a flame resistant insulated wire and/or cable construction that is flexible and relatively light in weight.

A further object of the invention is to provide a flame resistant insulated electrical wire and/or cable construction that will function normally at its design electrical load without power interruption.

A further object of the invention is to provide a tape which may usefully be employed in preparing a flame resistant insulated electrical wire and/or cable which will resist the transmission of high temperatures associated with fire to and through the wire, will not support combustion or contribute fuel to propagate a fire, will not emit toxic smoke or toxic products of combustion when subjected to heat and flames, will not melt, drip or shrink when subjected to the heat and flames of a fire, is flexible and relatively light in weight and/or will conduct electricity normally at its design electrical load without power interruption.

These and other objects of the invention which will become hereafter apparent, are achieved by providing a heat resistant flexible refractory tape with stretch properties and by forming an insulated electrical wire and/or cable by wrapping a conductor, preferably of copper, with this heat resistant flexible refractory tape with stretch properties.

This high temperature and heat resistant flexible refractory tape with stretch properties is formed by coating and impregnating a heat resistant porous base fabric, preferably a knitted fiberglass fabric with high temperature and heat resistant refractory materials such as alumina or zirconia utilizing a bonding agent such as a combination of acrylic latex and colloidal silica or acrylic latex alone. The refractory material may be admixed with the bonding agent so that the refractory materials are uniformly dispersed throughout the bonding agent and then the mixture may be applied to the porous base fabric to form the refractory coating. This refractory coating comprising the refractory materials and bonding agent is bonded to both the surface and the interstices of the porous base fabric. After impregnation and coating of the base fabric with the refractory coating, the coated fabric is preferably coated on both sides with a fire retardant, abrasion resistant, polymeric coating, dried and slit into desired widths to form the high temperaure resistant tape.

The tape is preferably wrapped around the wire or cable conductor overlapping a previous tape turn by 50% thereby creating a double layer of insulation for each wrapping of tape. A second tape may be wrapped over the first in the same manner creating a second double layer of insulation making a total of four layers of insulation wrapped around the conductor. In cables that contain two or more separate conductors, each conductor is preferably wrapped separately with a double layer of insulation; all the separately wrapped conductors are then brought together to form the desired electrical cable and are wrapped together in a bundle with high temperature insulation tape as previously described to provide a double layer of outer insulation.

In the presence of extreme temperatures and heat, the bonding agent containing the refractory materials will decompose, causing the refractory materials to fuse into the softened surface of the knit fiberglass base fabric, enabling it to withstand intense heat and elevated temperatures well beyond the normal melt temperature of the fiberglass fabric. The resulting fabric structure will have ceramic qualities and will not soften, melt, drip or lose its insulating properties.

A feature of the invention resides in the fact that the refractory materials are bonded in the interstices as well as to the surface of the base fabric, such that a significant amount of the fabric's flexibility and stretch properties are retained.

BRIEF DESCRIPTION OF THE DRAWINGS

The specific details of the best mode contemplated for carrying out the invention, and the manner and process of making and using it, will be particularly pointed out in clear, concise, and exact terms in conjunction with the accompanying drawings, wherein.

DESCRIPTION OF THE PREFERRED EMBODIMENTS

Referring now more particularly to the drawings, like numerals in the various illustrative FIGS. will be employed to designate like parts.

Figure 1:
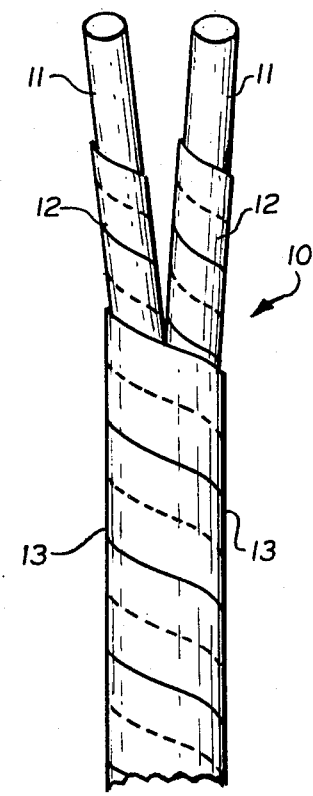
FIG. 1 is an enlarged partially sectioned perspective view of a segment of flame resistant insulated electric cable made in accordance with the invention showing two separately insulated copper wire conductors wrapped together.

The flame resistant insulated electrical cable 10, as illustratively depicted in FIG. 1, is comprised of two copper conductors 11, separately wrapped in high temperature resistant insulation tape 12, and bound together as a pair with an additional outer insulating wrapper 13 of high temperature resistant insulation tape. The insulation tape in both instances is wrapped such that it overlaps the previous turn by 50% thereby providing a double layer of insulation for each wrapping of tape. A flameproof adhesive is preferably applied to the tape just prior to wrapping to prevent any movement or lifting of the insulation when the cable is cut.

Alternatively, the flameproof adhesive may be preapplied to the tape. Several embodiments are thus possible. In one, the adhesive is applied to either side of the tape, i.e., to either face which contains the polymeric coating. In another, following the application of the refractory coating to both sides of the porous base fabric, the polymeric coating is applied to one of the refractory coating surfaces and the adhesive is applied to the other. The choice here will depend on the overall economics of the final electrical cable and the performance features which the user finds most desirable in the high temperature resistant insulation tape.

Figure 2:
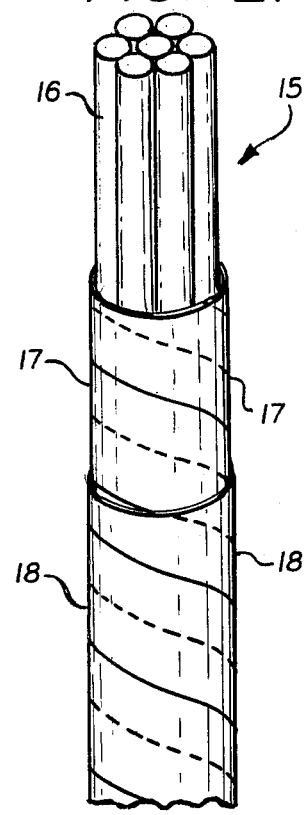
FIG. 2 is an enlarged partially sectioned perspective view of a segment of a flame resistant electrical cable construction showing a multi-stranded conductor with a double wrapped outer insulation.

The flameproof electrical cable construction 15, illustratively shown in FIG. 2, comprises a central multi-stranded copper cable conductor 16 wrapped with an inner insulation tape layer 17 and an outer insulation tape layer 18. In both instances the insulation tape is wrapped, as in FIG. 1, such that it overlaps the previous turn by 50% thereby providing a double layer of insulation for each wrapping of tape.

Figure 3:
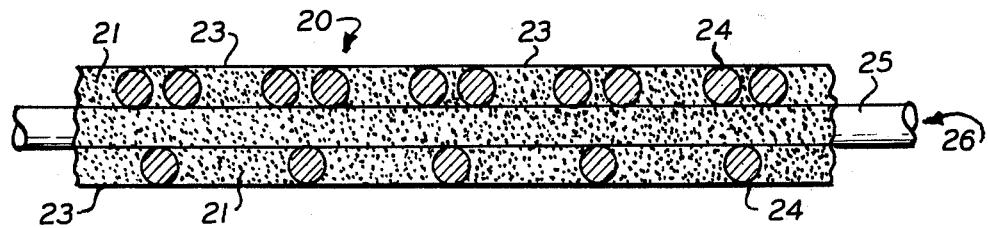
FIG. 3 is an enlarged cross-sectional view of the insulation made with a knit base fabric showing the impregnation coating of the refractory materials on both fabric surfaces as well as in the interstices of the fabric.

The flame resistant fabric construction 20 (from which insulating tape is formed), as illustratively shown in FIG. 3, is constructed of a knit fiberglass base fabric 26 having knit yarns 24 and fill yarns 25.

Satisfactory results have been obtained employing knit yarns 24 comprised of DE type fiberglass with a yarn designation of DE-150-1/0 and fill or lay in yarns 25 comprised of fiberglass with a yarn designation of DE-150-1/0.

The porous base fabric 26 of knit fiberglass used in the illustrated preferred embodiment of fabric construction may be produced on warp knitting machinery such as the Raschel type warp knitting machines, manufactured by Karl Mayer, GmbH, Germany; Liba, GmbH, Germany; Rockwell International, U.S.A.; and the Kidde Textile Machine Company, U.S.A. with the following preferred specifications.

Fabric Thickness: 0.16 inches.
Fabric Weight: 9 ounces per square yard.
Knit Pattern: Cable stitch and weft lay in.
Knit Construction: 3 Bar.
- 1st Bar: knit yarn-cable stitch 20 knitting stitches per inch of fabric width (yarn: fiberglass DE-105-1/0)
- 2nd Bar: lay in yarn-weft lay in 24 stitches or courses per inch of fabric length (yarn: fiberglass DE-150-1/0)
- 3rd Bar: reinforcing yarn (optional) (yarn: fiberglass DE-150-1/0)

As will be understood by those skilled in the art, the knit fiberglass substrate fabric 26, though preferably formed of all fiberglass yarns, may be constructed with other kinds of fire resistant knit yarns 24 or with only the weft lay in yarn 25 comprised of fiberglass. The substrate or porous base fabric may also be a woven fiberglass or a non-woven, porous web of fiberglass.

As used herein the term "fabric" includes materials which are woven, knitted, felted, fused, non-woven or otherwise constructed from fibers. Since the base fabric must have a porosity there must be an openness to the texture of the fabric so as to permit the refractory coating to impregnate the surface of the fabric and fill, at least partially, some, if not all, of the interstices of the porous fabric.

The refractory coating which is applied to both sides and impregnates the interstices of the porous base fabric comprises heat resistant refractory materials intermixed or dispersed in a bonding agent. The refractory materials may be any of the usual known refractory materials in finely divided form which will fuse with the porous base fabric when subjected to elevated temperatures, e.g., above about 1750° F., and includes compounds of aluminum, calcuim, chromium, magnesium, silicon, titanium, zirconium and the like, such as aluminum oxide, calcium oxide, magnesium oxide, silicon oxide, titantium oxide, zirconium oxide, aluminum silicate, calcium silicate, magnesium silicate, silicon carbide, zirconium carbide and the like. Alumina, zirconia, calcium silicate and silicon dioxide are preferred, alone or in combination.

The bonding agent is used to adhere or bond the refractory materials to the porous base fabric. Although the bonding agent will decompose at extremely high temperatures, e.g., above about 1750° F., it must do so without producing a flame. At these temperatures, the refractory materials will fuse into the surface of the porous fabric forming a high temperature resistant ceramic structure with insulation properties. Useful bonding agents include acrylic latex resin alone or in combination with colloidal silica.

The examples below describe a number of refractory coatings which are referred to in these examples as "refractory cements". The terms "refractory cement" and "refractory coating" are used synonymously in this specification. Further, in these same examples, components of the bonding agent are described as a "binder". One or two "binders" comprise the bonding agent.

In addition to the bonding agent and the refractory materials, the refractory coating may, optionally and preferably, contain a thickening agent. The purpose of the thickening agent is to add body and increase the viscosity of the refractory coating so as to simplify the process of applying the coating onto the porous base fabric and, additionally, to cause the refractory coating to adhere to the surface of the fabric. The preferred thickening agent is a 50 wt. % dispersion of an acrylate-vinylpyrrolidone copolymer in water.

As illustratively shown in FIG. 3, the base fabric 26 has been coated on both surfaces and impregnated with refractory materials 21 as contained in a refractory cement (also referred to herein as a refractory coating) which may be made up of a number of formulations as follows:

EXAMPLE 1

High Temperature and Heat Resistant Refractory Cement

| | Materials | Parts By Weight As Is |
|---|---|---|
| 1. | Binder<br>Colloidal Silica Dispersion<br>NYACOL 2050<br>NYACOL, Inc.<br>Ashland, MA 01721 | 400. |
| 2. | Binder - Organic<br>Acrylic Latex Resin<br>UCAR 189<br>(2½% solids in water)<br>Union Carbide Corp.<br>New York, NY | 100. |
| 3. | Aluminum Oxide<br>RC-172 DBM<br>Reynolds Metals Company<br>Chemicals Division<br>Richmond, VA 23261 | 300. |
| 4. | Thickening Agent<br>Collacral VL<br>(Acrylate-vinylpyrrolidone<br>copolymer, 50% solids in water)<br>Ciba-Geigy<br>Ardsley, NY | 100 |
| | Total | 900. |

EXAMPLE 2

High Temperature and Heat Resistant Refractory Cement

| | Materials | Parts By Weight As Is |
|---|---|---|
| 1. | Binder<br>Colloidal Silica Dispersion<br>NYACOL 2050<br>NYACOL, Inc.<br>Ashland, MA 01721 | 400. |
| 2. | Binder - Organic<br>Acrylic Latex Resin<br>UCAR 189<br>(2½% solids in water)<br>Union Carbide Corp.<br>New York, NY | 100. |
| 3. | Calcium Metasilicate<br>NYAD - 400<br>Interspace Corporation<br>Willsboro, NY 12996 | 100. |
| 4. | Silicon Dioxide<br>Min-U-Sil<br>Pennsylvania Glass Sand Corp.<br>Pittsburg, PA 15235 | 100. |
| 5. | Aluminum Oxide<br>RC-172 DBM<br>Reynolds Metals Company | 100. |

-continued

| Materials | Parts By Weight As Is |
|---|---|
| Chemicals Division Richmond, VA 23261 | |
| 6. Thickening Agent Collacral VL (Acrylate-vinylpyrrolidone copolymer, 50% solids in water) Ciba Geigy Ardsley, NY | 100. |
| Total | 900. |

EXAMPLE 3

High Temperature and Heat Resistant Refractory Cement

| Materials | | Parts By Weight As Is |
|---|---|---|
| 1. Kaowool Cement | | 400. |
| Alumina - Al$_2$O$_3$: | 41% | |
| Silica - SiO$_2$: | 57% | |
| Other: | 02% | |
| Total | 100% | |
| Babcock and Wilcox Refractories Division Augusta, GA | | |
| 2. Binder - Organic Acrylic Latex Resin UCAR 189 (2½% solids in water) Union Carbide Corp. New York, NY | | 30. |
| 3. Thickening Agent Collacral VL (Acrylate-vinylpyrrolidone copolymer, 50% solids in water) Ciba-Geigy Ardsley, NY | | 30. |
| Total | | 460. |

EXAMPLE 4

High Temperature and Heat Resistant Refractory Cement

| Materials | | Parts By Weight As Is |
|---|---|---|
| 1. QF - 180 Coating Cement | | 400. |
| Alumina - Al$_2$O$_3$: | 41% | |
| Silica - SiO$_2$: | 57% | |
| Other: | 02% | |
| Total | 100% | |
| The Carborundum Co. Niagara Falls, NY 14302 | | |
| 2. Binder - Organic Acrylic Latex Resin UCAR 189 (2½% solids in water) Union Carbide Corp. New York, NY | | 30. |
| 3. Thickening Agent Collacral VL (Acrylate-vinylpyrrolidone copolymer, 50% solids in water) Ciba-Geigy Ardsley, NY | | 30. |
| Total | | 460. |

EXAMPLE 5

High Temperature and Heat Resistant Refractory Cement

| Materials | Parts By Weight As Is |
|---|---|
| 1. Binder Colloidal Silica Dispersion NYACOL 2050 NYACOL, Inc. Ashland, MA 01721 | 400. |
| 2. Binder - Organic Acrylic Latex Resin UCAR 189 (2½% solids in water) Union Carbide Corp. New York, NY | 100. |
| 3. Alumina Bulk Fiber Ball Milled - "Saffil" Fiber Imperial Chemical Industries Ltd. United Kingdom | 300. |
| 4. Thickening Agent Collacral VL (Acrylate-vinylpyrrolidone copolymer, 50% solids in water) Ciba-Geigy Ardsley, NY | 100. |
| Total | 900. |

EXAMPLE 6

High Temperature and Heat Resistant Refractory Cement

| Materials | Parts By Weight As Is |
|---|---|
| 1. Binder Colloidal Silica Dispersion NYACOL 2050 NYACOL, Inc. Ashland, MA 01721 | 400. |
| 2. Binder - Organic Acrylic Latex Resin UCAR 189 (2½% solids in water) Union Carbide Corp. New York, NY | 100. |
| 3. Zirconia Fiber Ball Milled Zirconia Fiber Imperial Chemical Industries Ltd. United Kingdom | 300. |
| 4. Thickening Agent Collacral VL (Acrylate-vinylpyrrolidone copolymer, 50% solids in water) Ciba-Geigy Ardsley, NY | 100. |
| Total | 900. |

Figure 4:
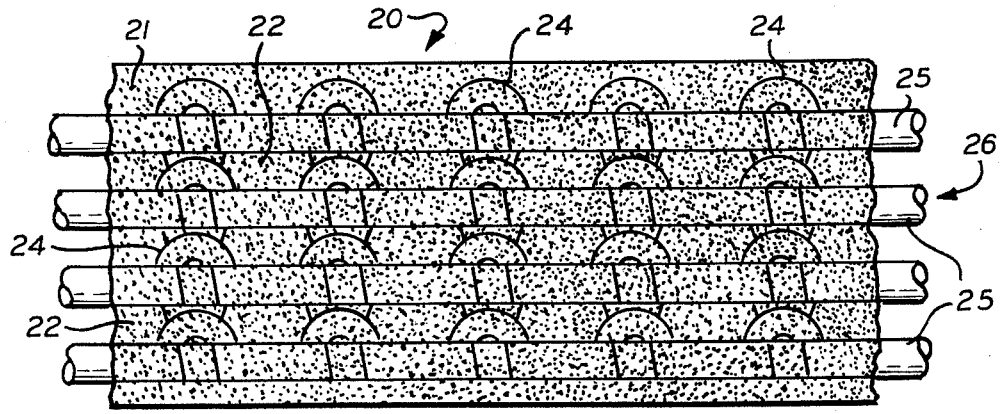
FIG. 4 is an enlarged perspective plan view of the knit base fabric construction showing the impregnation coating of the refractory materials on the surface and in the interstices of the fabric.

The base fabric 26 as illustratively shown in FIG. 3 and FIG. 4 has been coated on both sides and impregnated with a refractory coating or cement 21 formulated in accordance with the above examples at a coating density of approximately 10 ounces per square yard, based on dry net weight which represents about 50% of the overall weight of the impregnated base fabric.

A flameproof polymeric coating 23 is then applied over the refractory impregnation coating at a coating density of approximately 1 ounce per square yard, based on dry net weight, to improve the surface abrasion qualities of the fabric and to seal in and contain any refractory materials that may otherwise loosen from the fabric as it is stretched in the wire and/or cable wrapping process.

The flameproof polymeric coating is applied to both surfaces of the refractory coating or, optionally, to only one surface, particularly where the flameproof adhesive is pre-applied to the other surface of the refractory coating.

The polymer used in the polymeric coating must not produce a flame when exposed to a flame or the intense heat developed by a flame, i.e., temperatures of 1750° F. and above, even though it may decompose at these elevated temperatures. Polyvinyl chloride resin is the preferred polymer used in the polymeric coating. This coating is a mixture of selected plasticizers, stabilizers and modifiers, dispersion resins and oxides. A number of components are combined with the polyvinyl resins to provide the required properties of high temperature resistance and flexibility. The polymeric coating preferred in this invention has the following formulation:

| Polymeric Coating Materials | Parts By Weight As Is |
| --- | --- |
| 1. Plasticizers | |
| (a) Tricresyl Phosphate (TCP) Stauffer Chemical New York, NY or Ashland Chemical Columbus, OH | 20 |
| (b) Santicizer 148 (phosphate-type plasticizer) Monsanto Chemical Co. St. Louis, MO | 20 |
| (c) Santicizer 154 (phosphate-type plasticizer) Monsanto Chemical Co. St. Louis, MO | 20 |
| (d) Texanol Isobutylrate (TXIB) Eastman Chemical Products Inc. Kingsport, TN | 10 |
| (e) Epoxol 8-2B Epoxidized butyl linseed oil Swift Chemical Co. Chicago, IL | 5 |
| Total | 75 |
| 2. Stabilizers and Modifiers | |
| (a) Nuostabe Z-142 Calcium-zinc complex Tenneco Chemicals Inc. Piscataway, NJ | 1 |
| (b) Apon 828 Epoxy resin Shell Chemical Co. Houston, TX | 4 |
| (c) Cymel 301 Hexaneethoxymethylmelamine American Cyanamid Co. Wayne, NJ | 5 |
| (d) Pego Sperse 400MO Polyethylene glycol mono-oleate Glyco Chemicals Inc. Greenwich, CT 06830 | 1 |
| Total | 11 |
| 3. Dispersion Resins | |
| (a) Geon 130 X17 B.F. Goodrich Chemical Co. Cleveland, OH | 50 |
| (b) Geon 128 Polyvinyl chloride B.F. Goodrich Chemical Co. Cleveland, OH | 50 |
| Total | 100 |
| 4. Oxide Slurry | |
| (a) Tricresyl Phosphate (TCP) Stauffer Chemical New York, NY or Ashland Chemical Columbus, OH | 24.5 |// continued
| Polymeric Coating Materials | Parts By Weight As Is |
| --- | --- |
| (b) Pego Sperse 400MO Polyethylene glycol mono-oleate Glyco Chemicals Inc. Greenwich, CT | 0.35 |
| (c) T-Top-12 Titanate coupling agent Kenrich Petrochemicals, Inc. Bayonne, NJ | 0.15 |
| (d) Ti Pure R-900 Titanium Dioxide (TiO$_2$), rutite type E.I. duPont deNemours & Co. Wilmington, DE | 10. |
| (e) Antimony oxide | 10. |
| Total | 45. |

The construction of the base knit fiberglass 26 is designed to provide a coarseness such that the maximum thickness of the knit fabric, at a point where the yarns cross be at least 70% to 150% greater than the fabric thickness in areas of minimum thickness. The fabric construction further provides for interstices 22 of sufficient size such that when the fabric is impregnated and coated with the refractory materials, the quantity of refractory material contained and embedded in the fabric interstices will be sufficient to cause the overall weight of the impregnated fabric to be 70% to 150% greater than the weight of the base fiberglass fabric.

The impregnated fabric 20 as herein disclosed, is then slit to desired tape widths suitable for wrapping wire and/or cable conductors.

During the wire and/or cable wrapping process, a flame-proof polymeric adhesive is preferably applied to the inside surface of the tape to prevent it from unraveling or slipping from its 50% overwrap configuration. Alternatively, the adhesive may be pre-applied to one side of the surface of the tape during its fabrication. It may be applied directly onto one of the surfaces of the refractory coating or, where the polymeric coating has been applied to both surfaces of the refractory coating, to one of the polymeric coating surfaces. The thus assembled tape can be applied with the 50% overwrap configuration in a fashion similar to that described above where the adhesive is applied during the wrapping process. The flame-proof tape adhesive may be made up of a number of preferred formulations as follows:

EXAMPLE 7

| Flameproof Tape Wrapping Adhesive | |
| --- | --- |
| Materials | Parts By Weight As Is |
| 1. Binder Colloidal Silica Dispersion NYACOL 2050 NYACOL, Inc. Ashland, MA 01721 | 400. |
| 2. Binder - Organic Acrylic Latex Resin UCAR 189 (40% solids) Union Carbide Corp. New York, NY | 50. |
| 3. Thickening Agent Collacral VL (Acrylate-vinylpyrrolidone copolymer, 50% solids in water) Ciba-Geigy Ardsley, NY | 10. |

-continued

| Flameproof Tape Wrapping Adhesive | |
|---|---|
| Materials | Parts By Weight As Is |
| Total | 460. |

EXAMPLE 8

| Flameproof Tape Wrapping Adhesive | |
|---|---|
| Materials | Parts By Weight As Is |
| 1. Binder<br>Nitrile Latex-Type 1570 × 60<br>(20% solids in water)<br>B.F. Goodrich Chemical Co.<br>Cleveland, OH 44115 | 200. |
| 2. Aluminum Hydrate<br>SB-632<br>Solem Industries, Inc.<br>Atlanta, GA 30341 | 100. |
| 3. Thickening Agent<br>Collacral VL<br>(Acrylate-vinylpyrrolidone<br>copolymer, 50% solids in water)<br>Ciba-Geigy<br>Ardsley, NY | 20. |
| Total | 320. |

EXAMPLE 9

| Flameproof Tape Wrapping Adhesive | |
|---|---|
| Materials | Parts By Weight As Is |
| 1. Binder<br>Colloidal Silica Dispersion<br>NYACOL 2034A<br>NYACOL, Inc.<br>Ashland, MA | 40. |
| 2. Binder - Organic<br>Acrylic Latex Resin<br>UCAR 189<br>(40% solids)<br>Union Carbide Corp.<br>New York, NY | 5. |
| 3. Thickening Agent<br>Fumed Silica<br>Cab-O-Sil M-5<br>Cabot Corporation<br>Boston, MA | 2.5 |
| Total | 47.5 |

EXAMPLE 10

| Flameproof Tape Wrapping Adhesive | |
|---|---|
| Materials | Parts By Weight As Is |
| 1. Binder<br>Colloidal Silica Dispersion<br>Ludox HS-40<br>E.I. duPont deNemours & Co.<br>Wilmington, DE | 40. |
| 2. Binder - Organic<br>Acrylic Latex Resin<br>HYCAR 2679 × 6<br>B.F. Goodrich Chemical Co.<br>Cleveland, OH | 5. |
| 3. Thickening Agent<br>Fumed Silica<br>Cab-O-Sil M-5<br>Cabot Corporation<br>Boston, MA | 2.5 |
| Total | 47.5 |

Operation

In use, an insulated wire or cable is formed as above-described utilizing a refractory impregnated porous base fabric 26 to form insulating tape.

The impregnation coating of refractory material fills the interstices of the preferred base fabric comprising a knit fiberglass and is bonded to the surface of the fiberglass yarns forming a discontinuous film coating that allows the fiberglass yarn, as well as the coated fiberglass fabric to retain between 50% and 75% of its original uncoated flex properties. Further, the soft acrylate resin that is the principal ingredient of the collacral thickening agent used in the refractory coating cement serves as an internal lubricant by coating and suspending the very fine alumina, silica, etc. particles that comprise the refractory cement. The collacral thickening agent, upon drying, softens and modifies the otherwise very hard bonding characteristics of the refractory cement such that a more flexible bond to the fiberglass substrate fabric is formed.

The polymeric coating on the refractory impregnated base fabric acts to improve the surface abrasion characteristic and to seal in and contain any refractory material that may otherwise loosen or dust off during the wire and/or cable wrapping process. Wire and cable insulation tape is formed by slitting this coated and impregnated knit fabric to a desired tape width.

The adhesive applied to the inside surface of the insulation tape serves to implement adhesion of the tape as it is wrapped around the conductor forming a bond that will prevent slippage of the insulation wrap when the wire or cable is cut or subjected to surface abrasion as during electrical installations.

When the electrical and cable construction is subjected to a flame or the intense heat of a flame, the abrasion resistant polymeric coating on the surface of the insulation tape will decompose without flaming. Continued exposure to heat and/or flame causes the alumina and silica and other oxide components of the refractory cement coating to fuse into the surface of the fiberglass base fabric (fiberglass begins losing tensile strength at 800° F. and softens at about 1350° F.) forming a high temperature resistant fabric structure that behaves like a refractory, enabling the fiberglass substrate fabric to withstand intense heat and elevated temperatures well beyond its normal melt temperature. (The aluminas, silicas, and other inorganic oxide components of the refractory cement have continuous use temperatures of 2300° F. with melting points in excess of 3300° F.).

Only a small portion of the overall refractory oxide residues are fused into the fiberglass fabric surface. The remaining oxide residues (i.e., $Al_2O_3$, $SiO_2$, $CaO$, $ZrO_2$, etc.) aggregate on the surface and in the interstices 22 of the fiberglass substrate fabric forming a high temperature resistant composite fabric structure with excellent thermal reflectance and resistance to flame abrasion and thermal shock; and excellent insulating efficiency and dielectric strength. The refractory oxide residues further form a protective coating for the metallic wire and/or cable conductors providing additional heat insulative protection and dielectric properties. In addition, the alumina, silica and other oxides aggregate in and fill the interstices of the base fiberglass fabric forming together with the fused fiberglass fabric component, a highly efficient heat reflective surface.

It is thus seen that an improved flame resistant insulated electrical wire and/or cable construction has been provided which is relatively flexible with the ability to transmit electrical power without interruption while subjected to the heat of fire or the like.

The above disclosure has been given by way of illustration and elucidation, and not by way of limitation, and it is desired to protect all embodiments of the herein disclosed inventive concept within the scope of the appended claims.

What is claimed is:

1. A heat resistant, flexible, refractory, electrical insulating tape comprising:
   (a) a porous base fabric;
   (b) a refractory coating comprising refractory materials and a bonding agent, said refractory coating formed on the surface and interstices of said fabric by applying said refractory coating to both sides of said fabric and said refractory materials being capable of fusing with the porous base fabric at elevated temperatures;
   (c) an abrasion resistant polymeric coating formed on the outside surface of one of the refractory coatings, and
   (d) an adhesive formed on the outside surface of the other refractory coating.

2. A heat resistant, flexible, refractory electrical insulating tape comprising:
   (a) a porous base fabric;
   (b) a refractory coating comprising refractory materials and a bonding agent, said refractory coating formed on the surface and interstices of said fabric by applying said refractory coating to both sides of said fabric and said refractory materials being capable of fusing with the porous base fabric at elevated temperatures;
   (c) an abrasion resistant polymeric coating formed on the outside surface of both of the refractory coatings, and
   (d) an adhesive formed on the surface of one of the polymeric coatings.

3. A heat resistant, flexible, refractory, electrical insulating tape comprising:
   (a) a porous base fabric;
   (b) a refractory coating comprising refractory materials and a bonding agent, said refractory coating formed on the surface and interstices of said fabric with said refractory materials being capable of fusing with the porous base fabric at elevated temperatures; and
   (c) an abrasion resistant polymeric coating comprising polyvinyl chloride formed on the outside surface of said refractory coating.

4. A heat resistant flexible, refractory electrical insulating tape as in claims 1, 2 or 3 wherein the porous base fabric is a knitted fiberglass, a woven fiberglass or a non-woven, porous web of fiberglass.

5. A heat resistant, flexible refractory electrical insulating tape as in claims 1, 2 or 3 wherein the refractory materials are alumina, zirconia, calcium silicate, silicon dioxide or mixtures thereof.

6. A heat resistant, flexible, refractory electrical insulating tape as in claims 1, 2 or 3 wherein the bonding agent is acrylic latex resin or acrylic latex resin and colloidal silica.

7. A heat resistant, flexible, refractory electrical insulating tape as in claim 1, 2 or 3 wherein the bonding agent also comprises a thickening agent.

* * * * *